Sept. 1, 1970    H. RÜHLE    3,526,453

MOTION PICTURE CAMERA WITH EXPOSURE CONTROL

Filed March 27, 1968    3 Sheets-Sheet 1

Sept. 1, 1970          H. RÜHLE          3,526,453

MOTION PICTURE CAMERA WITH EXPOSURE CONTROL

Filed March 27, 1968          3 Sheets-Sheet 3

United States Patent Office 3,526,453
Patented Sept. 1, 1970

3,526,453
MOTION PICTURE CAMERA WITH
EXPOSURE CONTROL
Hans Rühle, Stuttgart, Germany, assignor to Zeiss Ikon
Aktiengesellschaft, Stuttgart, Germany
Filed Mar. 27, 1968, Ser. No. 716,548
Claims priority, application Germany, Mar. 31, 1967,
Z 12,778
Int. Cl. G03b 7/08, 19/18
U.S. Cl. 352—141                                    4 Claims

ABSTRACT OF THE DISCLOSURE

A motion picture camera with an exposure control device in which the camera release upon actuation first closes the electric circuit of the exposure control device and then closes the electric circuit for the camera drive which also operates the picture window shutter. The camera release also adjusts the rotary cage of the camera objective diaphragm for compensating the illumination of a photoelectric element of the exposure control device when the picture window shutter is stationary and no longer illuminates the photoelectric element with intermittent light.

---

This invention relates to a motion picture camera provided with an exposure control device which coacts with the picture window shutter and includes means for compensating for the variations in illumination of the photoelectric element at the running and the stationary condition of the picture window shutter.

Known motion picture cameras with exposure control devices of this type include means for regulating the light falling upon the photoelectric element. This light is controlled either by a special construction of the mirror surface which at the stationary condition of the picture window shutter is located behind the objective lens or by diaphragms arranged in this position.

This method of regulating the illumination of the photoelectric element has, however, several disadvantages.

In some constructions the light reducing element that with the stationary picture window shutter effects the necessary compensation, is also with the running picture window shutter passed through the control light beam path and this results in a further reduction of the already very weak light available for the exposure control. It remains furthermore open to debate whether to attempt to achieve in actual practice a uniform light reduction with the mentioned means because the expenditure involved would mean a considerable cost increase of the entire device.

Another solution which avoids the additional loss of light by the weakening of the control light also during picture taking has other disadvantages. This known construction requires additional structural elements and additional space for these elements. With the auxiliary diaphragm used in this known construction it is equally difficult to attain uniform results in mass production. The sensitivity dispersion of the photoelectric elements within the measuring area and production tolerances of the auxiliary diaphragm can only be offset by elaborate means during mounting.

In another known device the compensation is achieved by connecting a resistance in the circuit containing the exposure control means and disconectig this resistance, respectively. Here precautions have to be taken that the occurring contact resistances do not cause too great variations from measurement to measurement. Also this solution is unsatisfactory in view of the weak control currents available. The respective contacts have to be refined and finished in a special manner in order to hold up at least for a fairly long time of life.

The object of the invention is to overcome the aforementioned difficulties with simple means and to create a compensating device which works reliably also over a prolonged period of time.

This object is accomplished in that in a motion picture camera of the type mentioned the camera release for the purpose of a correction of the objective diaphragm aperture is connected with a rotary cage of an iris diaphragm whose diaphragm adjustment ring is operatively connected with the exposure control device disposed in the camera.

The diaphragm adjusting ring may according to the invention be limited in its movement by stops which are integral with the camera casing and are preferably in the form of warning lamp contacts, while the diaphragm scale which is moved together with the diaphragm adjusting ring is associated with a stationary index mark. In this manner it is made sure that the diaphragm value is indicated which corresponds to the diaphragm aperture required for the running picture window shutter, while the diaphragm aperture adjusted in effect by the connection between the camera release and the diaphragm cage when the picture window shutter is in its stationary position is not indicated.

According to the invention, the operative connection between the camera release button and the diaphragm cage may comprise a resilient intermediary member. It is likewise possible to divide this operative connection in such a manner that it becomes effective only in the release direction, thereby subjecting both parts, i.e., the release button and the diaphragm cage, independently from each other to the action of a return spring which urges these parts into their inoperative position prior to the release of the camera.

These and other objects of the invention will in the following be described with reference to the accompanying drawings from which details not pertinent to the invention proper were omitted for greater clarity.

Figure 2:
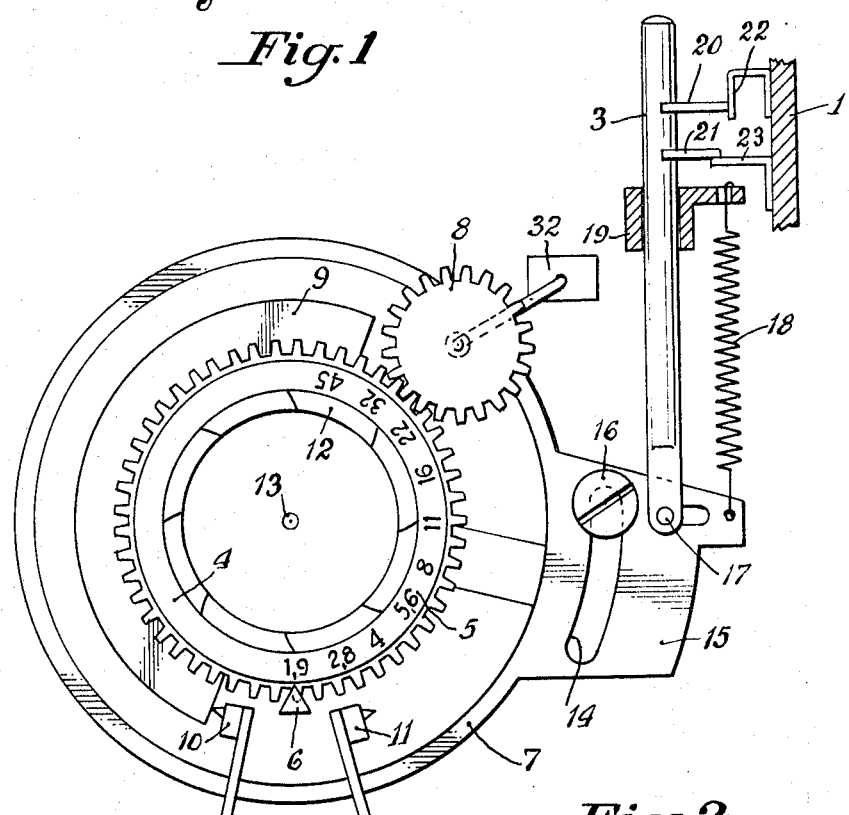
FIG. 2 is a diagrammatic view of the device of the invention on an enlarged scale, with the camera release button depressed and the diaphragm adjusted to its largest aperture.
Figure 4:
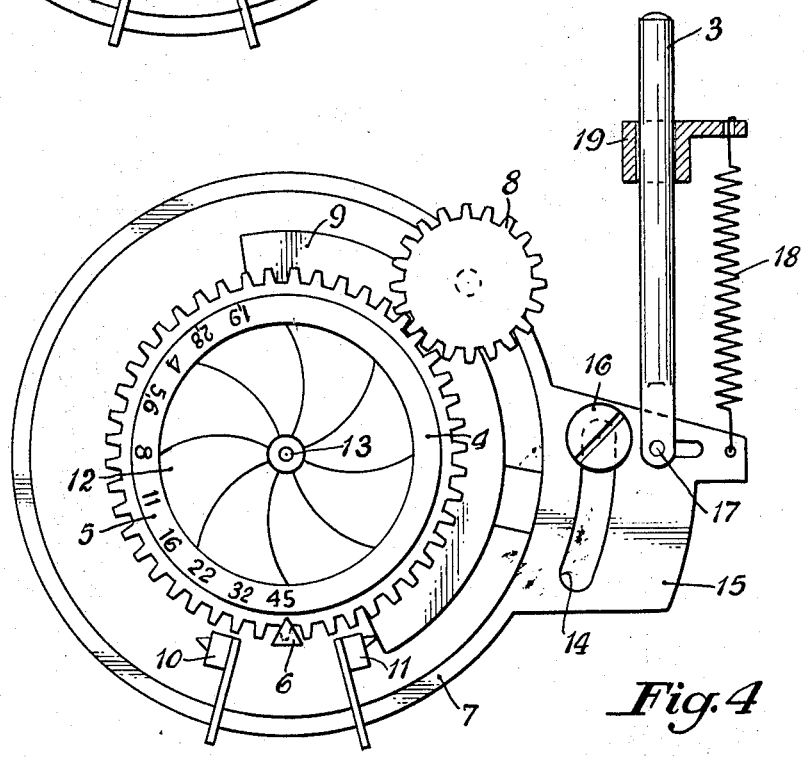
FIG. 4 is a view similar to FIG. 2, with the camera release button depressed, but with the diaphragm adjusted to its smallest aperture.
Figure 5:
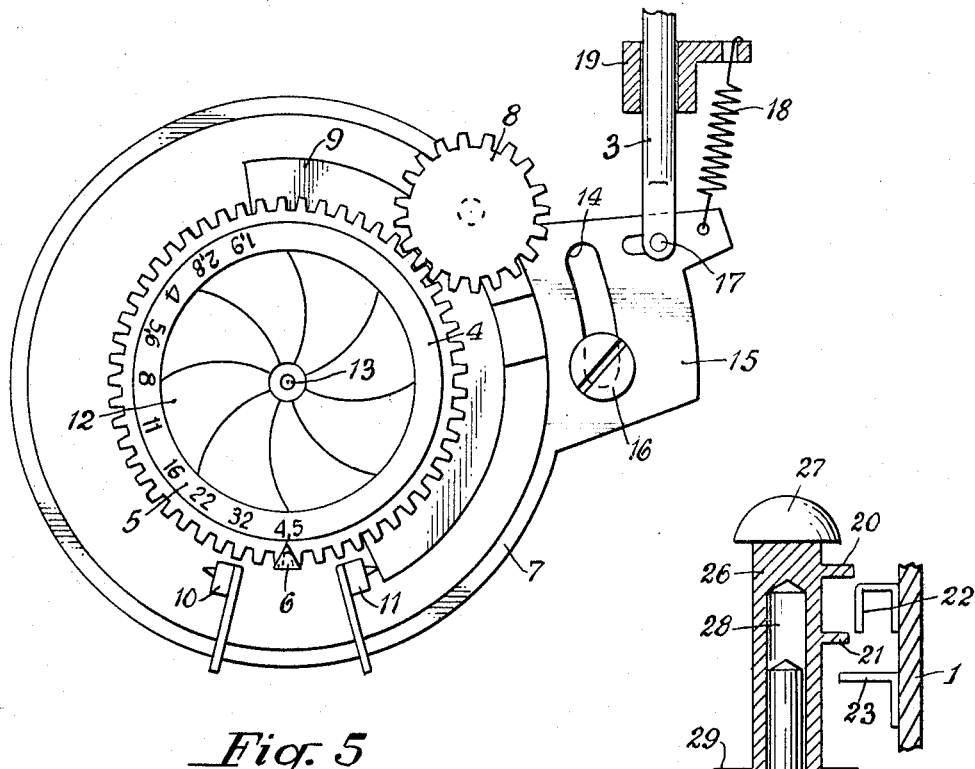
Figure 6:
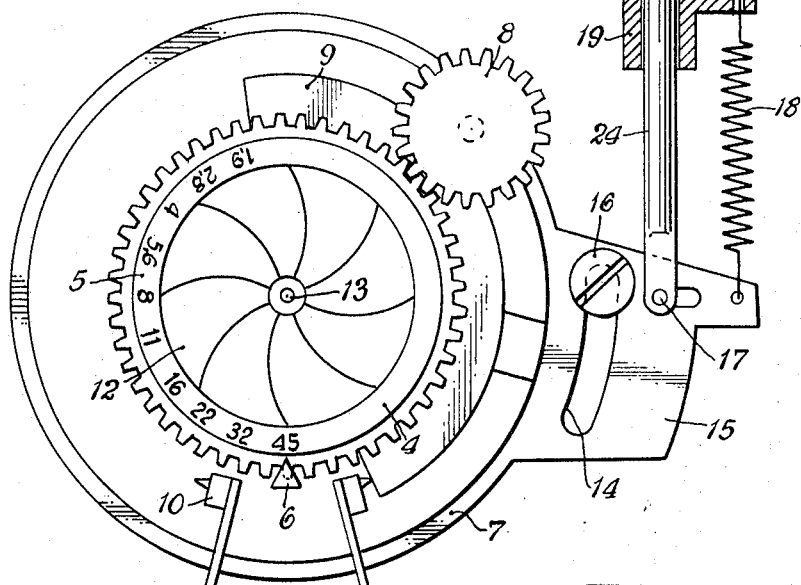

FIG. 5 is a view similar to FIG. 4, with the release button in rest position, smallest optically practicable diaphragm aperture indicated and the next smaller diaphragm aperture adjusted, and FIG. 6 is a diagrammatic view similar to FIG. 2, but with a subdivided release bolt and an individual return spring for the release button part, the diaphragm cage being in release position, the diaphragm being adjusted to its smallest aperture and the same aperture and the same aperture being indicated, and the release button part being returned to its rest position.

Figure 1:
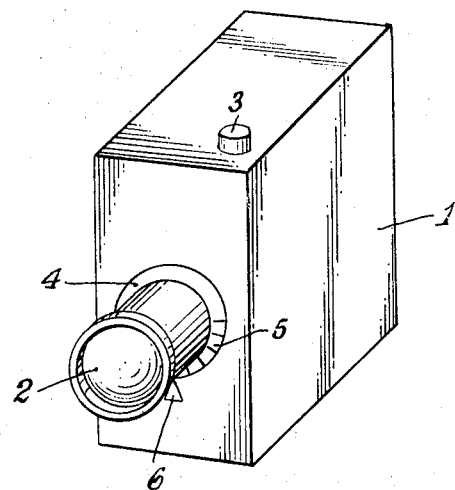
FIG. 1 is a perspective view of a motion picture camera according to the invention.

Referring to FIG. 1, a motion picture camera having a casing 1 is provided with an objective lens 2, a release button 3 and a device according to the invention with a diaphragm adjusting ring 4 having a diaphragm scale 5 arranged thereon, a stationary index mark 6 and a diaphragm cage 7, the latter being shown in FIG. 2. Connected to the diaphragm adjusting ring 4 is an exposure control device 32 by means of a gear wheel 8 which engages corresponding gear teeth on the diaphragm adjusting ring 4. The ring 4 is further provided with a semicircular collar 9. Fixedly attached to the camera casing 1 are two abutment members 10 and 11 constructed in the form of warning lamp contacts. The coaction of these two abutments 10 and 11 with the radial end faces of the semicircular collar 9 limits the rotatability of the diaphragm adjusting ring 4 to a range of diaphragm aperture values from 1.9 to 45.

The diaphragm adjusting ring 4 is in known manner connected with the leaves of an iris diaphragm 12 and by its position determines the size of the aperture formed by these diaphragm leaves, which latter in turn are connected with the diaphragm cage 7. The diaphragm cage 7 in the same manner as the diaphragm adjusting ring 4 is rotatably mounted about the camera objective axis 13. This rotatable movability of the diaphragm cage 7 is limited by a slot 14 arranged in a radial projection 15 provided on the diaphragm cage 7 and a shoulder screw 16 passing through the slot 14 and being in part attached to the camera casing 1. The radial projection 15 is further provided with another slot which is engaged by a pin 17 attached to the lower end of the camera release rod 3. Finally, a return spring 18 is attached with one end to the radial projection 15 and with its other end to a stationary guide sleeve 19 for the camera release rod 3. The normal function of the camera release 3 is indicated by contact springs 20 and 21 on the camera release 3 and contact springs 22 and 23 attached to the camera casing 1, this function being that first the exposure control device of the motion picture camera is rendered operative by the engagement of the contacts 20 and 22, and that at the end of the releasing motion of the camera release 3 the film drive mechanism of the motion picture camera is turned on by means of the engagement of the contacts 21 and 23.

Figure 3:
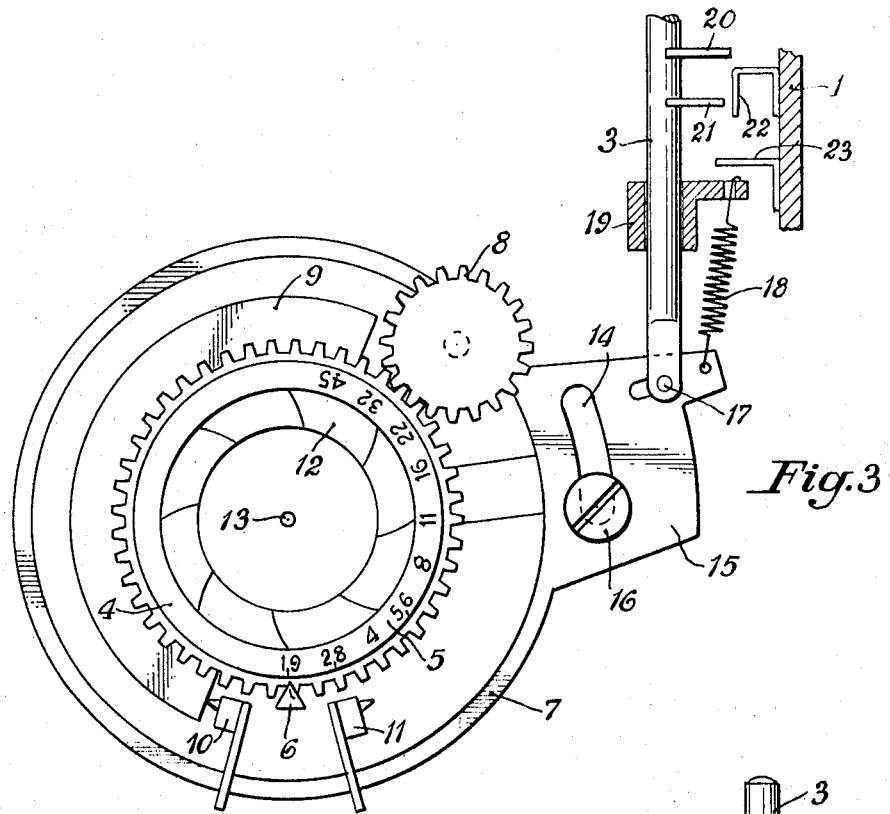
FIG. 3 is a diagrammatic view similar to that of FIG. 2, with the camera release button in rest position, the largest diaphragm aperture indicated and the diaphragm adjusted to the next smaller value.

In a device of the construction as illustrated in the FIGS. 1 to 5 the individual operations are as follows:

In the rest position of the camera release 3 the camera drive mechanism (film drive and picture window shutter) and the exposure control device are inoperative. The pairs of contacts 20, 22 and 21, 23 are open. Shortly after the start of the release operation, the contacts 20 and 22 close the circuit of the exposure control device and the diaphragm aperture is adjusted according to the amount of light conducted from the picture window shutter to the photoelectric element. By pushing the release 3 all the way down into its final position (FIG. 2), the contacts 21 and 23 are connected with each other and close the supply circuit for the camera drive mechanism. The film and the picture window shutter commence to run. At the same time, the camera release 3 moves the radial projection 15 and the diaphragm cage 7 is rotated so that the diaphragm aperture immediately adjusts itself to the light conditions prevailing on the photoelectric converter during the operation of the camera, i.e., to the impulse light. If now during picture taking the automatic exposure contorl device moves the diaphragm adjusting ring 4 by way of the gear wheel 8 into the stop position that signifies the largest diaphragm aperture 1.9, a warning lamp lights up which is associated with the warning lamp contact formed by the abutment 10. This means that the operator is warned to discontinue picture taking because of insufficient light. He lets go of the release 3 which now by the action of the spring 18 returns to its rest position. Simultaneously, the diaphragm cage 7 returns to its initial position which, as the final release position, is determined by the coaction of the slot 14 with the shoulder screw 16. FIG. 3 shows this position in which the diaphragm aperture has been reduced in size without affecting the indication of the diaphragm value. This smaller diaphragm aperture admits just enough light for the continuous illumination of the photoelectric element through the stationary shutter so that the adjustment of the diaphragm adjusting ring 4 need not be changed when the camera again is set into motion and the photoelectric element receives only impulse light.

FIGS. 4 and 5 illustrate the same effect when the diaphragm adjusting ring 4 reaches the stop position against the abutment 11, i.e., at the smallest possible diaphram aperture. Further reducing the size of the optically practicable smallest diaphragm aperture upon releasing the camera release 3 and the subsequent return of the diaphragm cage 7 into its initial position is only then possible when the leaves of the iris diaphragm 12 still mechanically permit such a movement.

In the event that the smallest optically practicable diaphragm aperture 45 is identical with the smallest mechanically feasible aperture of the iris diaphragm, a camera release may be provided of the type according to the second embodiment illustrated in FIG. 6.

In this modified embodiment, the camera release consists of a release rod 24, a disc 25, a tubular release button portion 26 having a button 27 at its upper end and a bore 28 with a flange 29 at its lower end. The upper end of the release rod 24 which faces the release button portion 26 is surrounded by a compression spring 30 whose lower end engages the disc 25. The release rod 24 and the release button portion 26 are so assembled that the portion of the release rod 24 which is surrounded by the compression spring 30 extends into the bore 28 in the release button portion 26. The compression spring 30 engages with its upper end the lower face of the flange 29. When the camera release is actuated by depressing the button 27, first of all the spring 30 is compressed. As soon as the upper solid release button portion 26 strikes the upper end of the release rod 24, the release operation begins. As already described with reference to the first embodiment, first the supply circuit for the exposure control device is closed and at the end of the release stroke the supply circuit for the camera drive mechanism is also closed by the contact pairs 20, 22 and 21, 23, respectively. Again, the pivotal movement of the diaphragm cage 7 has brought about an opening up of the diaphragm aperture by an amount necessary for light compensation. In the event that the exposure control device due to the prevailing light conditions again permits the diaphragm to assume its largest opening 1.9, the situation described with respect to the first embodiment repeats itself. The operator releases the button 27. The diaphragm cage 7 returns by the action of the return spring 18 together with the release rod 24 to its starting position and in doing so closes the diaphragm aperture to a size which corresponds to the compensation value. The return of the release button portion 26 into its starting position is effected by the compression spring 30 in cooperation with the return spring 18.

In case the diaphragm is closed down to its smallest aperture value 45 during picture taking, a warning lamp will light up. Again, the operator releases the button 26, 27. However, since now a further closing of the iris diaphragm 12 is mechanically not possible, the diaphragm cage 7 will remain in its position which is the same as the release position. The compression spring 30 returns the release button portion 26 into its initial or rest position.

If at a later picture taking session or the preparation therefor the light conditions due to a closing of the exposure control circuit again require an adjustment to a larger diaphragm aperture, the diaphragm adjusting ring 4 is adjusted by the gear wheel 8 of the exposure control device. At that time also the diaphragm cage 7 may return to its initial position by the action of the return spring 18.

What I claim is:

1. A motion picture camera which includes a camera casing, a camera release means on said casing, an adjustable objective diaphragm having a rotary diaphragm cage and a diaphragm adjusting ring, an exposure control device having a photoelectric element energized by the intermittent light passing through the camera shutter, means for compensating for the varying illumination of said element when the camera is stationary and is operating, means for operatively connecting said camera release means with said rotary diaphragm cage for rotatably adjusting the same so as to correct the aperture of said objective diaphragm, and means including a gear connection for operatively connecting said diaphragm adjusting ring with said exposure control device.

2. A motion picture camera which includes a camera casing, a camera release means on said casing, an adjustable objective diaphragm having a rotary diaphragm cage and an diaphargm adjusting ring, an exposure control device having a photoelectric element, means for compensating for the varying illumination of said element when the camera is stationary and is operating, means for operatively connecting said camera release means with said rotary diaphragm cage for correcting the aperture of said objective diaphragm, means for operatively connecting said diaphragm adjusting ring with said exposure control device, and including abutments on said casing which limit the rotative adjustment of said diaphragm adjustment ring in both directions, said abutments being constructed as warning lamp contacts, a diaphragm scale on said diaphragm adjusting ring and movable with said adjusting ring relatively to a stationary index mark so as to indicate the diaphragm value which corresponds to the objective diaphragm aperture required for an operating camera, while the objective diaphragm aperature adjusted by the operative connection between said camera release and said diaphragm cage when the camera shutter is stationary is not indicated.

3. A motion picture camera according to claim 2, in which said operative connection between the camera release and the diaphragm cage includes a resilient intermediary member.

4. A motion picture camera according to claim 2, in which said operative connection between said release and said diaphragm cage is divided into two parts in such a manner that it becomes effective only in the release direction, thereby subjecting both said parts comprising a release button and a release rod connected with said diaphragm cage independently from each other to the action of a return spring which urges said parts into their inoperative position prior to the release of the camera.

References Cited
UNITED STATES PATENTS

| | | | |
|---|---|---|---|
| 3,128,669 | 4/1964 | Steisslinger | 352—141 |
| 3,419,326 | 12/1968 | Borner | 352—141 |

JOHN M. HORAN, Primary Examiner

J. F. PETERS, JR., Assistant Examiner

U.S. Cl. X.R.

95—64; 352—166